Figure 1:
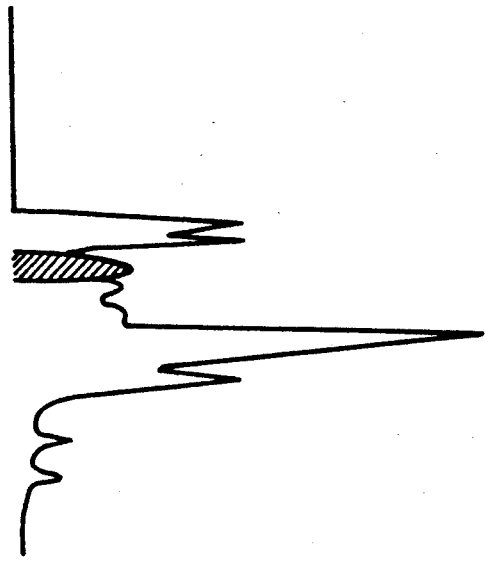

United States Patent [19]

Bottomley

[11] Patent Number: 5,194,591

[45] Date of Patent: Mar. 16, 1993

[54] ISOLATION OF AN IMMUNOGLOBULIN RICH FRACTON FROM WHEY

[75] Inventor: Robin C. Bottomley, High Wycombe, England

[73] Assignee: Express Foods Europe Limited, South Ruislip, England

[21] Appl. No.: 279,917

[22] Filed: Dec. 5, 1988

[30] Foreign Application Priority Data

Dec. 11, 1987 [GB] United Kingdom ............... 8729031

[51] Int. Cl.$^5$ .......................... C07K 3/02; C07K 3/26; C07K 3/28
[52] U.S. Cl. ................ 530/387.1; 210/767; 424/535; 530/389.1; 530/412; 530/414; 530/416
[58] Field of Search .............. 530/412, 414, 416, 832, 530/833, 387, 387.1, 389.1; 210/767; 424/535

[56] References Cited

U.S. PATENT DOCUMENTS

| | | | |
|---|---|---|---|
| 3,930,039 | 12/1975 | Kuipers | 530/414 |
| 4,229,342 | 10/1980 | Micabel | 530/414 |
| 4,436,658 | 3/1984 | Peyrouset et al. | 530/415 |
| 4,816,252 | 3/1989 | Stott et al. | 530/916 |
| 4,834,974 | 5/1989 | Stott et al. | 530/414 |
| 4,897,465 | 1/1990 | Cordle et al. | 530/412 |

FOREIGN PATENT DOCUMENTS

| | | |
|---|---|---|
| 0243544 | 11/1987 | European Pat. Off. |
| 2487642 | 2/1982 | France |
| 2493851 | 5/1982 | France |
| 1312877 | 4/1973 | United Kingdom |
| 1573995 | 9/1980 | United Kingdom |
| 2188526 | 10/1987 | United Kingdom |

OTHER PUBLICATIONS

Kanamaru et al., Agric. Biol. Chem. vol. 46(6) pp. 1531–1538 (1982).

Collard et al., Ann. Rech. Vet. vol. 15(4) pp. 497–502 (1984) (abstract).

Hofi et al., Egypt. J. Food. Sci. O. (Special Issue) pp. 65–72 (1987) (abstract).

Michabek et al., Infect. Immun. vol. 55(10) pp. 2341–2347 (1987).

Collard et al., Ann. Rech. Vet., vol. 15(4) pp. 497–501 (1984).

Primary Examiner—Merrell C. Cashion, Jr.
Assistant Examiner—Andrew G. Rozycki
Attorney, Agent, or Firm—Beveridge, DeGrandi & Weilacher

[57] ABSTRACT

A method of producing a whey protein concentrate rich in immunoglobulins which comprises fractionating whey proteins into an immunoglobulin rich fraction and an immunoglobulin depleted fraction and concentrating at least the immunoglobulin rich fraction, in which either (i) a protein containing liquid selected from the group consisting of a whey, a liquid whey protein concentrate or a reconstituted whey protein concentrate powder is subjected to ultrafiltration through a membrane having a molecular weight cut-off of substantially 500,000 whereby to directly produce an immunoglobulin enriched concentrate together with fat, the permeate containing at least a major proportion of the remaining whey proteins, or (ii) a protein containing liquid selected from the group consisting of a whey, a liquid whey protein concentrate or a reconstituted whey protein concentrate powder is subjected to the action of an anion-exchange resin to produce an effluent, the whey proteins in which contain a higher proportion of immunoglobulins than those in the original protein-containing liquid and an eluate the whey protein content of which contains a depleted proportion of immunoglobulins and subjecting at least the effluent to concentration by ultrafiltration.

17 Claims, 2 Drawing Sheets

ISOLATION OF AN IMMUNOGLOBULIN RICH FRACTON FROM WHEY

The present invention relates to a process for isolating an immunoglobulin rich fraction from whey.

It has long been known how to isolate immunoglobulins from various materials. However, whilst whey is rich in immunoglobulins, due to the nature of the products concerned, up until now it has not been commercially viable to obtain an immunoglobulin rich concentrate from whey.

As long ago as 1971 the use of milk as a potential antibody source was realised. In U.S. Pat. No. 3,553,317, the possibility of deriving antibodies from the milk of a cow or a goat was proposed. Whilst the quantity of antibody available from such a source was considered to be substantial, practical utilisation of the source could not be realised.

It is known to the biochemist to isolate and purify antibodies by physical methods which involve the separation of groups of molecules based upon their physical properties such as molecular weight, isoelectric point, electrophoretic mobility and solubility in various systems. Inherent in this approach is the fact that antibodies, regardless of immunological specificity would be isolated together. Similarly, the immunologist would tend to rely upon the primary characteristics of all antibodies, i.e. their ability to react with a specific antigen. Thus, if an antigen is added to a mixture containing a specific antibody, the antigen and antibody would complex and precipitate from the solution.

Generally these methods have been carried out on serum and no-one has yet proposed a successful and commercially viable industrial process for use on other systems such as milk products and particularly the whey left from cheese making.

Thus UK Patent Specification 2044775A discloses a process for preparation of immunoglobulin for intravenous administration involving the purification of immunoglobulin obtained from human plasma by a combination of a fractional precipitation method and an affinity chromatography method.

In U.S. Pat. No. 4,256,631, another process of preparing immunoglobulin obtained from human plasma for intravenous administration is described which process involves a combination, in an arbitrary order, of a fractional precipitation in which one or more divalent or trivalent salts are added as precipitants to an aqueous solution of such immunoglobulin, together with affinity chromatography.

In U.S. Pat. No. 4,229,342, a process for extracting proteins from skimmed milk is described. This patent in considering the state of the art as of May, 1977 indicates that the processing of skimmed milk was generally carried out, firstly by extracting casein by acid or enzymatic coagulation, and then extracting the proteins from the milk serum by means of thermal- coagulation, ultrafiltration or ion exchange and finally, separating the lactose which can be hydrolysed. It further states that the disadvantage of proteins extracted from milk serum by thermal- coagulation is that they thereby lose some of their biological properties, and that the same is true of proteins extracted from milk serum by ultra-filtration since the length of the operation generally necessitates pasteurisation of the milk serum. Furthermore, separation of proteins from milk serum by ion exchange is very difficult to achieve on an industrial scale because the known dextran and cellulose base ion exchangers have weaker mechanical properties. It acknowledges that whilst ion exchangers have been proposed which do not suffer from such disadvantages the coagulated casein is still in its precipitated partially deteriorated state.

U.S. Pat. No. 4,229,342 proposes to solve the problem by extracting the proteins other than casein first by contacting the skimmed milk with one or more anionic ion-exchangers and to the action of silica, the silica being responsible for selectively fixing the immunoglobulins in the skimmed milk. However the binding efficiency of silica is low and the yields would not support an industrial scale process.

French Patent No. 2520235 describes the separation of proteins from colostrum by subjecting a skimmed colostrum or a colostrum serum to electrophoresis to form a fraction enriched with immunoglobulins and further subjecting the enriched fraction to fractionation by chromatography.

U.S. Pat. No. 4,436,658 describes the extraction of lactoferrin from whey or concentrated whey or whey from which proteins other than lactoferrin have already been removed by absorption onto a solid support such as silica at a weakly basic pH of 7.7 to 8.8.

Maubois et al of the Dairy Research Laboratory INRA described in a paper presented to the WPI/IDF International Whey Conference in Chicago, U.S.A. in 1986 the addition of calcium ions to whey at about 2° C., adjustment of the pH to about 7.3 and rapidly raising the temperature of the whey to about 50° C. and maintaining this temperature for about 8 minutes to effect aggregation of lipoproteins through calcium bonding and precipitation of the aggregate to form a clarified whey. The presence of the lipoproteins in the whey was stated by Maubois et al to be the cause of the failure of prior proposals for the fractionation of proteins from whey in that the lipoproteins are both amphoteric and amphiphilic and therefore limit ultrafiltration by being strongly absorbed on to membrane materials causing irreversible fouling.

The preferential extraction of lactoferrin and immunoglobulin from whey is described in UK Patent Application GB 2179947. The process involves concentration of the whey (obtained after removal of casein and fat from raw milk) 5-fold by ultrafiltration using a polysulphone membrane (with molecular cut-off of 25,000-50,000) followed by diafiltration and adsorption of the protein by ion-exchange treatment using a weak cationic carboxymethyl resin at pH 5-8.5 and preferably at 7-8 and elution at the same pH. Again, however, yields are too low for viability on an industrial scale. The present invention is predicated in part on the realisation that the problem really arises from the binding charcteristics of immunoglubulins in that when they are bound with sufficient effectiveness to extract a viable quantity, the bound immunglobulins are extremely difficult to remove by elution so that the overall yield is still too low for viability on an industrial scale. Resins from which removal is comparatively easy suffer from the disadvantage that they do not bind sufficient immunoglobulin in the first place.

Thus, whilst much research and trial has been undertaken no simple and effective industrial scale process for the extraction of immunoglobulin from whey has resulted.

It is an object of the present invention to provide such a process which enables the extraction of a concentrate high in immunoglobulins from whey on a viable industrial scale.

It has surprisingly been found that despite the presence of lipoproteins, ultrafiltration methods can be used either alone or in combination with anion-exchange treatment to effect such an extraction. The method may be conducted on whey or on liquid whey protein concentrates whether directly formed from whey or reconstituted from whey protein concentrate powder.

The present invention provides a method of producing a whey protein concentrate rich in immunoglobulins which comprises fractionating whey proteins into an immunoglobulin rich fraction and an immunoglobulin depleted fraction and concentrating at least the immunoglobulin rich fraction, characterised by either (i) subjecting a whey or liquid whey protein concentrate to ultrafiltration through a membrane having a molecular weight cut-off of substantially 500,000 whereby to directly produce an immunoglobulin enriched concentrate together with fat, the permeate containing at least a major proportion of the remaining whey proteins, or (ii) subjecting whey or a liquid whey protein concentrate to the action of an anion-exchange resin to produce an effluent, the whey proteins in which contain a higher proportion of immunoglobulins than those in the original whey or whey protein concentrate and an eluate the whey protein content of which contains a depleted proportion of immunoglobulins and subjecting at least the effluent to concentration by ultrafiltration.

If desired defatting may also be effected. Thus defatting may be carried out on the original whey, whey protein concentrate or reconstituted concentrate, the concentrate resulting from (i), or the effluent resulting from (ii).

In the case of procedure (ii) liquid whey protein concentrate either directly formed or reconstituted from whey protein concentrate powder is contacted with an anion exchanger resin such as Spherosil QMA resin (Rhone-Poulenc), Sepharose Fast Flow Q (Pharmacia) or Trisacryl Q resin (IBF), to form an effluent rich in immunoglobulins (particularly immunoglobulin G) and containing all the residual fat in the original whey protein concentrate together with some of the other whey proteins. The bound proteins which include a minor proportion of immunoglobulins may be eluted from the ion-exchange resin with dilute sodium chloride solution, e.g. 0.3M NaCl and the column cleaned for re-use with dilute hydrochloric acid, i.e. 0.1 M HCl followed by demineralised water. Although the hydrochloric acid also elutes bound protein the acid destroys the structure and activity of any remaining bound immunoglobulin. The fat can then be separated from the effluent or alternatively the fat can be separated from the concentrate first and the defatted concentrate contacted with the anion exchange resin.

The defatting of the whey protein concentrate is preferably effected by sedimentation using isinglass as the precipitant (e.g. 1% concentration of isinglass), the whey protein concentrate being diluted to approximately 1% protein concentration before defatting. The defatting method of GB 3290374 may also be used if desired.

Defatting of the whey or of the column effluent from the ion-exchange can also be effected by sedimentation using isinglass as the precipitant provided that the ash/protein ratio is less than 0.08:1. If the ash/protein ratio is greater than 0.08:1 then the whey or effluent needs to be demineralised as for example by ion-exchange, electro dialysis or ultrafiltration to bring the ash/protein ratio down below 0.08:1. Partial ultrafiltration of the column effluent can be effected very efficiently due to the low solids content of the effluent stream.

Ultrafiltration can be effected at temperatures in the range of from 4° to 60° C, preferably 48 to 55° C. The ion-exchange step may be effected at temperatures in the range of from 4° to 55° C, preferably 4° to 10° C.

The pH of the anion-exchange resin may be from 2.0 to 6.5 but is preferably from 3.5 to 4.0. The pH of the liquid subjected to the ion-exchange may be from 5.5 to 7.0 but is preferably 6.0 to 6.4.

The membranes used for ultrafiltration may be of any commercially available type but are preferably polysulphone membranes. For the production of a whey protein concentrate the molecular weight cut off of the membrane may be from 3,000 to 500,000. When a membrane having a molecular weight cut off of substantially 500,000 is used on whey or defatted whey however, it has surprisingly been found that although immunoglobulins $G_1$ and $G_2$ which constitute some 75% of the immunoglobulins present in the whey have molecular weights below 200,000 (or 160,000) nevertheless almost the whole of the recoverable immunoglobulin content of the whey remains in the concentrate, and the permeate, although containing a substantial proportion of other whey proteins, contains only a very small amount of immunoglobulins. For example, about 88% by weight of the immunoglobulins in the whey have been found to remain in the concentrate, with only about 4.5% by weight of the immunoglobulins finding their way into the permeate, the remainder (some 7%) being the result of the usual processing loss. The concentrate thus produced will contain all of the fat in the original whey but provided the presence of the fat is not objectionable, may be used directly as an immunoglobulin concentrate. If the fat is objectionable, then defatting of the concentrate may be effected or the original whey can be defatted before ultrafiltration. The concentrate can be further treated, according to the invention, by subjecting the concentrate to the action of an anion-exchange resin which binds the other whey proteins but has only little or no binding capacity for immunoglobulins. The whey proteins in the effluent will have a higher proportion of immunoglobulins than those of the concentrate.

When the whey is subjected to ultrafiltration through a membrane having a substantially lower molecular weight cut off than 500,000, the whey protein content of the permeate is decreased and the relative proportion of immunoglobulins in the concentrate to the other whey proteins in the concentrate is also decreased until at a molecular weight cut off of 10,000 or less substantially the whole of the whey proteins remain in the concentrate. Treatment of the concentrate with an anion-exchange resin in the manner of the invention to produce an immunoglobulin enhanced effluent is therefore generally necessary when the first ultrafiltration is undertaken with membranes having molecular weight cut offs of substantially less than 500,000. The anion-exchange treatment may also be effected on untreated whey, but is best performed on a concentrate produced by ultrafiltration.

In contrast to the methods of the prior art, the anion-exchange treatment used according to the present invention does not seek to selectively bind the immunoglobulins on the resin but rather to bind the other whey proteins and thus separate at least a proportion thereof from the immunoglobulins which pass through into the effluent which is thereafter concentrated by further ultrafiltration.

The ultrafiltration following the anion-exchange resin treatment also affords the possibility of further fractionation depending on the molecular weight cut off of the membrane used. Thus, depending on the membrane chosen, a greater or lesser proportion of proteins other than immunoglobulins can be allowed to pass into the permeate.

The invention can also provide a permeate which is substantially free of immunoglobulins and which may then be subjected to further fractionation, e.g. by the method of U.K. Patent Application No. 87 23651 to produce a fraction rich in α-lactalbumin.

The invention will be further illustrated by reference to the following Examples which are purely illustrative.

EXAMPLE 1

1,500 liters of Cheddar whey with a true protein concentration of 4.8 grams per liter were concentrated by the use of a Romicon PM10 membrane having an area of 10 m$^2$ to provide a whey protein concentrate of 75% protein on total solids. The whey protein concentrate, (accordingly known as WPC 75) was then diluted to 1% protein (680 liters) and defatted by sedimentation using isinglass as the precipitant (1% concentration of isinglass). The resulting supernatant yielded approximately 50% immunoglobulin. This was further purified by adjusting the pH to 6.2 with potassium hydroxide and applying the supernatant to a Pharmacia Bio Process 252 column packed with Spherosil QMA resin (Rhone/Poulenc, France). Since the volume of this ion exchange column was only 50 liters, supernatant was processed in batches of 210 liters at a time.

The eluant, i.e. the material passing unretarded through the column was collected. 702 liters of eluant was collected and this was concentrated by ultrafiltration using a Romicon PM100 membrane. This resulted in a liquid concentrate of 23 liters having an overall yield of immunoglobulin of 24% that in the whey. This concentrate was then dried by lyophilisation and the protein bound to the ion exchange column was eluted as detailed in Example 2.

EXAMPLE 2

A liquid whey protein concentrate (WPC 60) was applied to a 45 liter column of Spherosil QMA resin (Rhone-Poulenc, France) at a flow rate of 4 liters per minute, and washed through with demineralised water. 95 liters of effluent passing untreated through the column were collected (and could be treated as in Example 1).

The bound protein fractions were eluted by:
1. The use of 0.3 molar sodium chloride,
2. The use of 0.1 molar hydrochloric acid., and
3. The column was then washed in demineralised water until a pH of 3.5 was attained. The column was then used for further cycles.

The results in terms of grams of starting material and the three ion-exchange fractions are set out in Table 1.

TABLE 1

|  | Total Solids | True Proteins | Fat | Immunoglobulin Fraction IgG1 |
|---|---|---|---|---|
| Starting WPC | 2510 | 1720 | 260 | 175 |

TABLE 1-continued

|  | Total Solids | True Proteins | Fat | Immunoglobulin Fraction IgG1 |
|---|---|---|---|---|
| Effluent | 1010 | 460 | 260 | 92 |
| NaCl Eluate | 700 | 560 | 0 | 26 |
| HCl Eluate | 600 | 480 | 0 | * |

*(0.1 molar HCl destroys immunoglobulin structure and activity).

As can be seen by the analysis of Table 1, the effluent fraction contained a high percentage of fat as well as immunoglobulins. Hence defatting was carried out. This was effected by a settling method, the pH being adjusted to 4.3 by addition of hydrochloric acid and flocculation induced by addition of isinglass (1% solution) directly to the effluent. Two defatting operations were effected, the results of which can be seen in Table 2.

TABLE 2

|  | 1 | 2 |
|---|---|---|
| Volume effluent | 177 liters | 100 liters |
| Volume supernatant | 152 liters | 90 liters |
| Total solids recovered in supernatant | 53.1% | 74.4% |
| True protein recovered in supernatant | 41.2% | 64.0% |
| Fat recovered in supernatant | 4.2% | 21.0% |
| Immunoglobulins recovered in supernatant | 63.4% | 89.0% |

The immunoglobulins in the defatted protein concentrate were then concentrated and fractionated by ultrafiltration using a Romicon PM100 membrane with an area of 10 m$^2$.

The resulting concentrate of immunoglobulins was then dried by lyophilisation to yield an overall percentage of immunoglobulin from the starting whey protein concentrate of 33%.

EXAMPLE 3

80 liters of sweet white Cheddar whey (pH 6.05) were concentrated on a Romicon PM500 membrane (hollow fibre cartridge type; membrane are 0.46 m$^2$). During the run, the temperature was maintained at 10° to 12° C. until the final stages of concentration, when it rose to 18° C. The run lasted 5 hours and the final concentrate colume was 3.5 liters; whey/concentrate flow was maintained at high velocity (2.2 m/sec) throughout the average permeate flux was 34 l/m$^2$/h. The final concentrate was freeze dried and had the following composition:

| Total solids: | 96.0% |
|---|---|
| Total protein: | 51.4% |
| Fat: | 7.1% |

The IgG content (as a percentage of true protein) of both the PM500 concentrate and the permeate were determined directly from RID plates using Radial Immuno Diffusion. The results are shown in Table 3 together with that for whey (results derived from a good quality WPC 75 concentrate) for comparison.

TABLE 3

| PM500 concentrate | 12.5% |
|---|---|
| Whey | 8.6% |
| PM500 permeate | 2.0% |

The yields for the PM500 concentrate and PM500 permeate are shown in Table 4.

TABLE 4

|  | PM500 Concentrate | PM500 permeate |
|---|---|---|
| Total solids | 615 g | 4257 g |
| Total protein | 344 g | 384 g |
| True protein | 316 g | 204 g |

The PM500 permeate was concentrated by ultrafiltration through a PM10 membrane and freeze dried. Analysis details for the whey and freeze-dried concentrate are shown as percentages by weight in Table 5.

TABLE 5

|  | Whey | PM500 permeate Ultrafiltrated and freeze-dried |
|---|---|---|
| Solids | 6.23% | 91.6% |
| Fat | 0.03% | 0.3% |
| Total protein | 0.88% | 82.6% |
| Ash | 0.51% | 2.9% |

Figure 2:
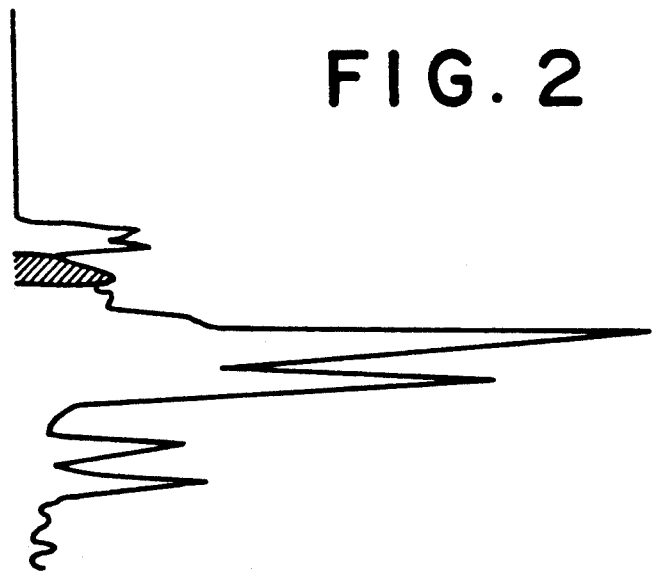
Figure 3:
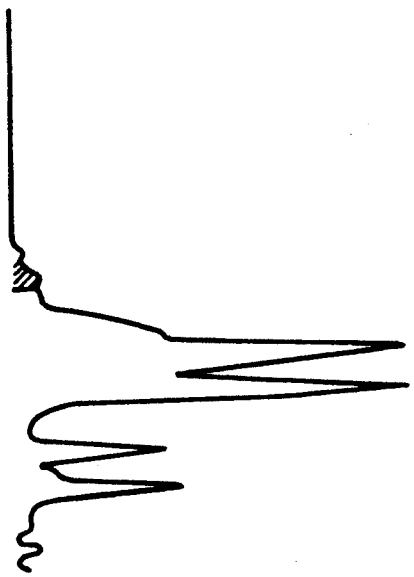

Chromatographic profiles were also produced for the PM500 concentrate, the whey and the PM500 permeate and are shown in the accompanying drawings in which FIG. 1 is a profile of the PM500 concentrate, FIG. 2 is a profile of the whey and FIG. 3 is a profile of the PM500 permeate. In each figure the shaded area corresponds to the immunoglobulins. The HPLC profiles were produced on LDC equipment with a TSK G2000 SW Column using a 0.1M phosphate buffer at a pH of 6.2 and a flow rate of 0.7ml/min. The samples were 20ul of 1% by weight concentration and detection was by UV absorption at 220 nm.

The invention is not restricted to the details of the foregoing embodiments, nor limited to the Examples. For example, although in the Examples specific ultrafiltration membranes and ion exchange media have been used, these are not unique, similar membranes, e.g. Abcor MSD 181 and quaternary and ammonium ion exchange resins, e.g. Pharmacia Fast Flow Q, IBF Trisacryl Q and those produced by other manufacturers could be similarly used. Equally, whey other than that generated from Cheddar cheese production may be used.

EXAMPLE 4

1820 liters of milk were converted into Cheddar cheese and whey by normal commercial processes. The whey was clarified and separated on a Westfalia centrifugal separator to remove excess residual fat to give 1550 liters of separated whey. Using the procedures described in Example 1 the separated whey was concentrated to produce 185 liters of UF concentrate, defatted, purified by ion exchange to produce 682 liters of column effluent, concentrated and dried to produce 466 grams of final product. The total protein in the starting milk, intermediate products and final product are set out in Table 6 below:

TABLE 6

|  | Total protein (%) |
|---|---|
| Milk | 3.06 |
| Separated whey | 0.77 |
| UF concentrate | 4.32 |
| Column effluent | 0.13 |
| Final product | 68.1 |

The final powder comprised 32.7% immunoglobulin $G_1$ ($IgG_1$), representing an overall yield of about 25% of that in the milk.

Figure 4:
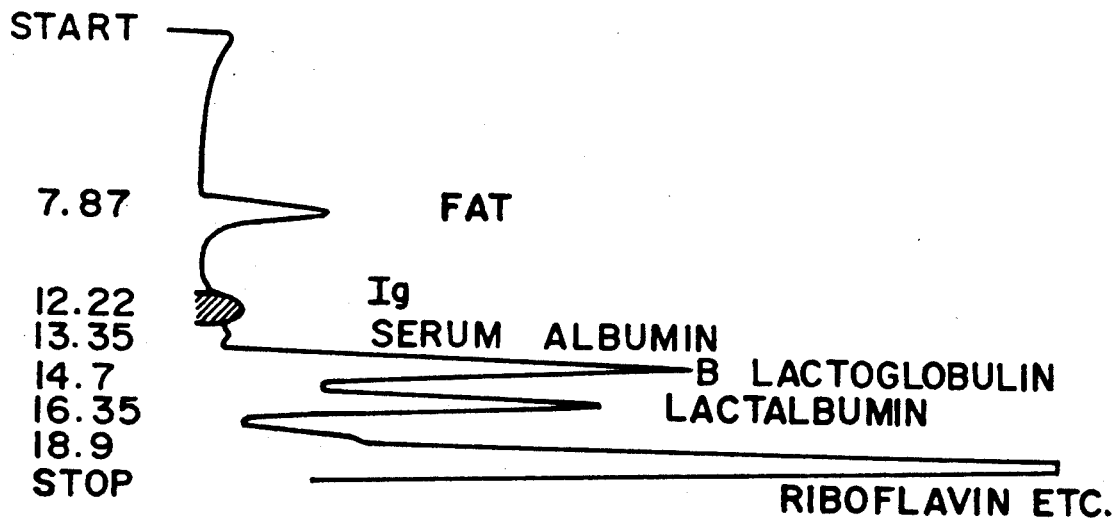
Figure 5:
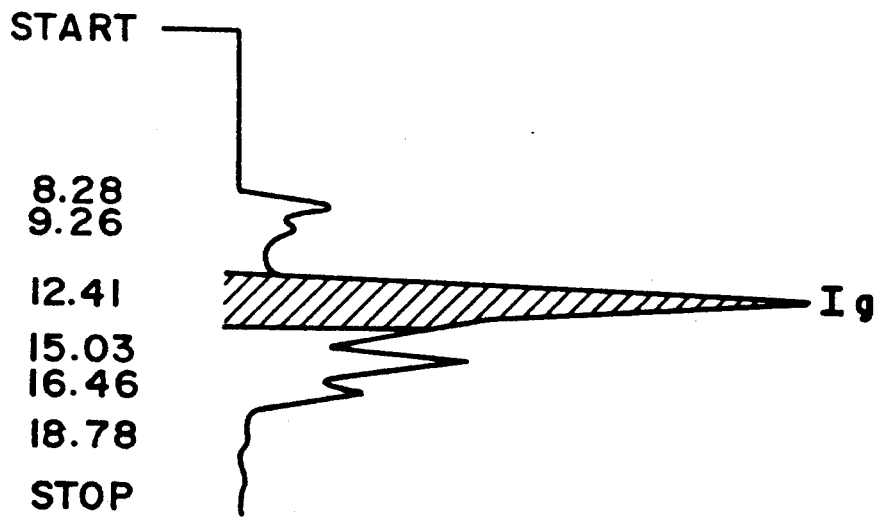

Chromatographic profiles were produced in the same way as in Example 3 in respect of the separated whey and the final product and are shown respectively in FIGS. 4 and 5 of the accompanying drawings. Correlation between time, concentration and area in these profiles are reproduced below in Table 7 (corresponding to FIG. 4) and Table 8 (corresponding to FIG. 5). The shaded areas in FIGS. 4 and 5 correspond to immunoglobulin.

TABLE 7

| Time | Concentration | Area |
|---|---|---|
| 7.87 | 7.7256 | 249713 |
| 12.22 | 2.1302 | 68853 |
| 13.35 | 0.5029 | 16257 |
| 14.7 | 24.9206 | 805500 |
| 16.35 | 18.3036 | 591621 |
| 18.9 | 46.4169 | 1500316 |
|  | 99.9998 | 3232260 |

TABLE 8

| Time | Concentration | Area |
|---|---|---|
| 8.28 | 4.5344 | 69899 |
| 9.26 | 5.3721 | 82793 |
| 12.41 | 65.2074 | 1004957 |
| 15.03 | 15.9783 | 246254 |
| 16.46 | 8.4886 | 130825 |
| 18.78 | 0.4178 | 6439 |
|  | 99.9986 | 1541167 |

I claim:

1. A method of producing a whey protein concentrate rich in immunoglobulins which comprises fractionating whey proteins into an immunoglobulin rich fraction and an immunoglobulin depleted fraction and concentrating at least the immunoglobulin rich fraction, in which a protein containing liquid selected from the group consisting of a whey, a liquid whey protein concentrate or a reconstituted whey protein concentrate powder is subjected to ultrafiltration through a membrane having a molecular weight cut-off of about 500,000 whereby to directly produce an immunoglobulin enriched concentrate together with fat.

2. The method as claimed in claim 1, in which defatting is effected on the protein-containing liquid or the concentrate resulting from ultrafiltration.

3. A method as claimed in claim 2, in which the defatting of whey protein concentrate or reconstituted whey protein concentrate powder is effected by sedimentation using isinglass as the precipitant, the concentrate or reconstituted powder being diluted to substantially 1% by weight protein concentration before defatting.

4. The method as claimed in claim 2, in which the defatting of the original protein-containing liquid is effected by sedimentation using isinglass as the precipitant.

5. The method as claimed in claim 4, in which the ash/protein ratio of the original protein-containing liquid, if not below 0.08:1, is first adjusted to a value below 0.08:1 by demineralizing said original whey.

6. A method as claimed in claim 3, in which the isinglass is used in an amount of substantially 1% by weight based on the liquid being defatted.

7. A method as claimed in claim 1, in which ultrafiltration is performed at a temperature in the range of 4° C. to 60° C.

8. A method as claimed in claim 7, in which the temperature is in the range of from 48° C. to 55° C.

9. The method according to claim 1, which further comprises subjecting said immunoglobulin enriched concentrate to the action of an anion-exchange resin.

10. The method according to claim 9, wherein said action of said anion-exchange resin is at a pH of about 2.0–6.5.

11. The method according to claim 10, wherein said pH is from 3.5 to 4.0.

12. A method of producing a whey protein concentrate rich in immunoglobulins which comprises fractionating whey proteins into an immunoglobulin rich fraction and an immunoglobulin depleted fraction and concentrating at least the immunoglobulin rich fraction, in which a protein containing liquid selected from the group consisting of a whey, a liquid whey protein concentrate and a reconstituted whey protein concentrate powder is subjected to the action of an anion-exchange resin at a pH of about 2.0–6.5 to produce an effluent, the whey proteins in which contain a higher proportion of immunoglobulins relative to said protein-containing liquid and an eluate the whey protein content of which contains a depleted proportion of immunoglobulins relative to said protein containing liquid and subjecting at least the effluent to concentration by ultrafiltration through a membrane having a molecular weight cut-off of about 500,000.

13. The method according to claim 12, wherein the pH of said anion-exchange resin is about 3.5–4.0.

14. A method as claimed in claim 12, in which the anion exchange step is effected at a temperature in the range of 4° C. to 55° C.

15. A method as claimed in claim 14, in which the temperature is in the range of from 4° C. to 10° C.

16. A method as claimed in claim 12, in which the pH of the liquid subjected to the anion exchange is from 5.5 to 7.0.

17. The method as claimed in claim 12, further comprising defatting said original protein-containing liquid or the said effluent.

* * * * *

UNITED STATES PATENT AND TRADEMARK OFFICE
CERTIFICATE OF CORRECTION

PATENT NO. : 5,194,591
DATED : March 16, 1993
INVENTOR(S) : Robin Bottomley

It is certified that error appears in the above-identified patent and that said Letters Patent is hereby corrected as shown below:

On the title page:

In Item [73], please replace "Express Foods Europe Limited" with --Grand Metropolitan Foods Europe Limited--.

Signed and Sealed this

Twenty-fifth Day of January, 1994

Attest:

BRUCE LEHMAN

Attesting Officer

Commissioner of Patents and Trademarks